Dec. 11, 1923.
C. M. NAUGLE
CAKE PAN
Filed Dec. 9, 1922
1,476,910
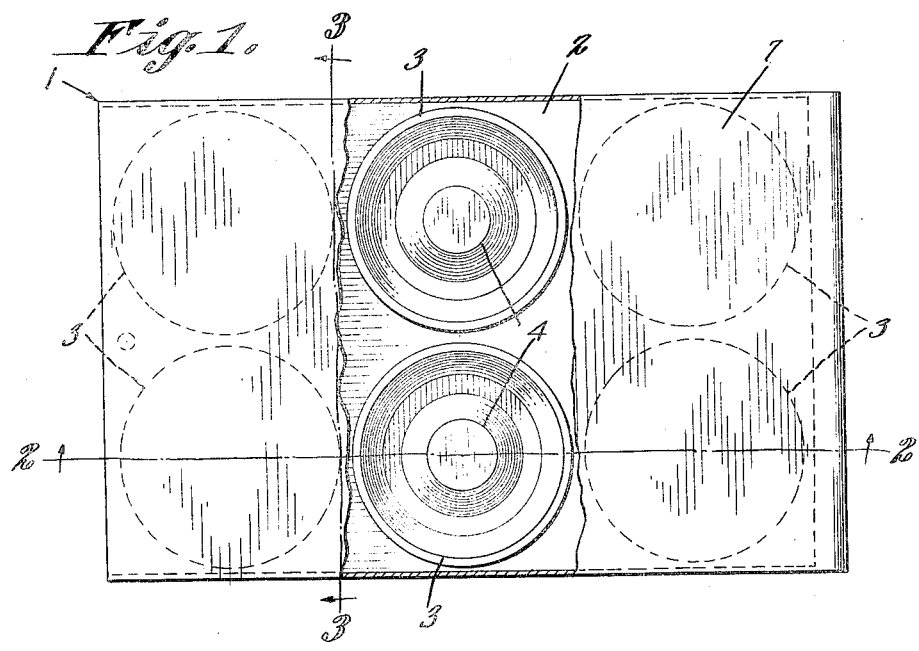
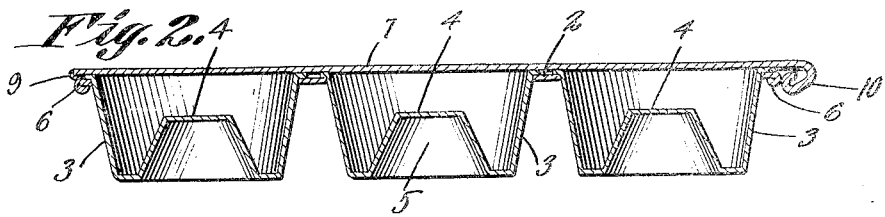
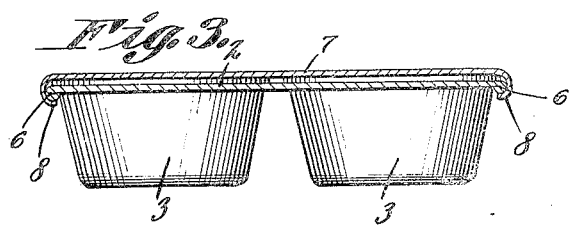
C. M. Naugle,
Inventor.
By
Attorneys.

Patented Dec. 11, 1923.

1,476,910

UNITED STATES PATENT OFFICE.

CHARLES M. NAUGLE, OF WILKES-BARRE, PENNSYLVANIA.

CAKE PAN.

Application filed December 9, 1922. Serial No. 605,868.

*To all whom it may concern:*

Be it known that I, CHARLES M. NAUGLE, a citizen of the United States, residing at Wilkes-Barre, in the county of Luzerne and State of Pennsylvania, have invented a new and useful Cake Pan, of which the following is a specification.

This invention relates to cooking utensils, and more particularly to pans for baking individual cakes or muffins, and as molds for jelly and the like.

The object of the invention is to provide a pan of this character so constructed that the cake may be baked either right side up or upside down so that both faces will be flat to form a reversible base for the cake, said pan having a projection to form in one face of the cake a pocket or recess to receive a filling.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of the utensil embodying this invention with parts broken out to illustrate the interior.

Fig. 2 is a longitudinal section taken on the line 2—2 of Fig. 1, and

Fig. 3 is a transverse section taken on the line 3—3 of Fig. 1.

In the embodiment illustrated, the pan 1 constituting this invention may be made in nests of six or more, six being here shown, and this pan comprises a body portion in the form of a plate 2 having depending therefrom a plurality of cup-shaped dough receptacles 3, each of which has a centrally disposed projection 4 here shown in the form of a truncated cone. These pockets or receptacles 3 each are designed for molding cakes, biscuits, muffins or any other individual edible products. It will be obvious that a device molded in one of these cup-shaped receptacles 3 will have a central recess 5 when completed which may be used to receive a filling of any desired character.

A head 6 extends around the perimeter of the body member 2 and is designed as a reinforce for the plate 2 and to slide in guides 8 formed along the side edges of a removable cover 7. This cover 7 is preferably constructed of sheet metal and the guides are formed by bending inwardly the side edges thereof.

The front edge of the cover 7 is preferably reinforced by folding the sheet from which it is constructed inwardly flat against the face of said top as shown at 9. The rear edge of the cover plate 7 is rolled inwardly as shown at 10 to form a stop for limiting its movement in one direction relatively to the pan 1 and also forms a finger grip to facilitate the removal of the lid or cover.

In the use of this pan, the dough to be cooked or other material to be molded is placed in the receptacles 3 and the cover 7 slid over the top thereof as is shown clearly in the drawings. The pan 1 may then be placed in the oven either upside down or right side up for baking or if the material is simply to be molded the pan with the cover applied may be placed in a refrigerator or any other suitable place for cooling the contents to permit them to harden and conform to the shape of the mold.

From the above description it will be obvious that cakes, biscuit or the like baked in this pan will have both faces flat, the lid 7 preventing the dough from rising up as is usual in muffin pans, so that when the cakes are removed, either face may be used as the base, and if desired, the pockets or recesses 5 may be filled with whipped cream or any other suitable filling.

A pan or mold constructed as herein shown and described is simple and cheap to manufacture, and as stated above, may be used either as a baking pan for cakes and the like, or as a mold for gelatin or the like.

It will also be obvious that this pan may be used for baking two sets of cakes at the same time, the batter for one set being placed in the cups or receptacles 3, the lid 7 placed thereon and the pan inverted and more batter placed in the recesses 5, the pan being thus utilized to form cakes of different sizes baked simultaneously thus economizing in oven space.

I claim:—

A pan of the class described comprising a body portion in the form of a plate having depending therefrom a plurality of cup shaped receptacles each of which has a centrally disposed projection, a bead extending around the perimeter of said body, a removable cover plate having guides along its side edges to slidably receive said bead and tightly retain the plate against the upper edges of the cup-shaped receptacle, the front edge of the cover being folded flat against the face thereof to form a reinforce and the rear edge folded to form a stop to limit the movement of the cover in one direction and also a finger grip to facilitate the removal of the cover.

In testimony that I claim the foregoing as my own, I have hereto affixed my signature in the presence of two witnesses.

CHARLES M. NAUGLE.

Witnesses:
H. H. DAVENPORT,
L. M. THOMAS.